United States Patent
Berthiaud

(10) Patent No.: US 8,820,641 B2
(45) Date of Patent: Sep. 2, 2014

(54) MAGNETIC READ DEVICE

(75) Inventor: Olivier Berthiaud, Cornas (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 317 days.

(21) Appl. No.: 13/024,477

(22) Filed: Feb. 10, 2011

(65) Prior Publication Data

US 2011/0192903 A1 Aug. 11, 2011

(30) Foreign Application Priority Data

Feb. 10, 2010 (FR) ..................... 10 50938

(51) Int. Cl.
*G06K 7/08* (2006.01)
*G11B 5/127* (2006.01)

(52) U.S. Cl.
CPC ............ *G11B 5/127* (2013.01); *G06K 7/084* (2013.01)
USPC ........................... 235/449; 235/451

(58) Field of Classification Search
USPC .................. 235/449, 451, 453, 493
See application file for complete search history.

(56) References Cited

U.S. PATENT DOCUMENTS

| 4,371,905 A | * | 2/1983 | Valstyn et al. | ............... 360/112 |
| 6,400,138 B1 | * | 6/2002 | Andermo | ............... 324/207.17 |
| 2008/0266709 A1 | * | 10/2008 | Albertini et al. | ............... 360/110 |

FOREIGN PATENT DOCUMENTS

| EP | 0286842 A2 | 10/1988 | |
| EP | 0318626 A1 | 6/1989 | |
| FR | 2779560 A1 | 12/1999 | |
| GB | 2338104 A * | 12/1999 | ............ G11B 23/00 |

OTHER PUBLICATIONS

Search Report issused in French Application 1050938 on Aug. 2, 2010.

* cited by examiner

*Primary Examiner* — Sonji Johnson
(74) *Attorney, Agent, or Firm* — Vedder Price PC

(57) ABSTRACT

A magnetic read device including: a magnetic read head including a first conductive winding; and a second conductive winding connected in phase opposition to the first winding.

7 Claims, 3 Drawing Sheets

MAGNETIC READ DEVICE

BACKGROUND OF THE INVENTION

1. Field of the Invention

The present invention relates to a device for reading from a magnetic track. It more specifically aims at a magnetic read head of an electronic payment terminal or of a check reader.

2. Discussion of Prior Art

Some electric payment terminals are capable of reading cards provided with magnetic tracks, or magnetic cards. In this case, a magnetic card reader is provided, for example, in the form of a slot, open at its ends, where a user can slide a magnetic card. A magnetic read head, connected to a printed circuit of the terminal, is flush with an internal wall of the slot. The read head enables to read data stored on a magnetic track of the user's card on sliding of the card in the slot.

FIG. 1 is a front view schematically showing a magnetic read head 1 such as can be found in current electronic payment terminals.

FIG. 2 is a cross-section view of read head 1 along plane 2-2 of FIG. 1.

Read head 1 comprises an approximately parallelepipedal package 3, especially containing one or several electromagnetic read circuits. Package 3, generally made of metal, comprises a front surface 5 intended to be flush with an internal wall of the reader slot. Front surface 5 is slightly bulged, so that a magnetic card 7 (FIG. 2) can slide against this surface without risking to catch on package 3. Front surface 5 comprises one or several horizontal slots 8 (in the orientation of FIG. 1) defining reading paths, three paths 9a to 9c (FIG. 1) in this example, arranged at different heights to be able to read from magnetic tracks arranged at different heights on the card. This especially enables the reader to be compatible with different categories of magnetic cards. All reading paths are similar, for example, at the level of path 9b, package 3 contains a magnetic read circuit comprising a ring-shaped magnetic core 11b (FIG. 2), arranged along a plane parallel to the lower and upper surfaces of the package (in the orientation of FIG. 1). Ring 11b is not closed but is interrupted by a non-magnetic gap 13b, generally made of air or of a solid non-magnetic material such as brass or a resin. Gap 13b is in contact with or at very short distance from the portion of path 9b at the contact of which the magnetic card is intended to slide, and is generally covered with a protection varnish. A conductive winding 15b is formed around the region of the ring opposite to gap 13b. In practice, the height of gap 13b is slightly greater than the height of the magnetic tracks likely to be read. The gap width is linked to the data writing resolution on the magnetic track. In the field of magnetic payment cards, the gap width generally ranges between 5 and 50 µm.

Magnetic read circuits are also associated with reading paths 9a and 9c. FIG. 1 shows gaps 13a and 13c of the magnetic circuits associated with paths 9a and 9c. To improve the mechanical resistance of the head and/or for security reasons, the inside of package 3 is generally embedded in a resin (not shown) in a final manufacturing step.

The passing of a magnetic track of card 7 in front 13 of the concerned reading path 9 causes a variation of the magnetic flow in the corresponding core 11. This results in the occurrence of an induced current and thus in a variation of voltage $V_{OUT}$ across winding 15. Payment terminals generally comprise a processing unit, not shown, for extracting from signal $V_{OUT}$ the data stored on the magnetic track.

A disadvantage of this type of read heads is that they are very sensitive to external electromagnetic disturbances. Signal $V_{OUT}$ is thus tainted with noise. If the read head is used in a very noisy environment, it may become impossible to extract from signal $V_{OUT}$ the data stored on the magnetic card. This may especially occur in an electronic payment terminal located in a store, close to an anti-theft gate. In the case of a motor-driven magnetic check reader, the motors for driving the device also are a source of noise for the reader head. Further, the various wireless telecommunication devices are as many possible noise sources for read heads.

Some payment terminals comprise a software and/or hardware noise filtering unit. However, in addition to the extra cost resulting from the provision of such a unit, this solution does not enable to totally do away with external disturbances, especially when these disturbances are of high amplitude and/or generate parasitic signals in the same frequency band as the wanted signal.

Terminals comprising, in addition to the usual magnetic read head, an additional magnetic head for measuring the noise and a signal processing unit for restoring, from the signals provided by the read head and by the noise measurement head, an estimate of the non-noisy wanted signal, have also been provided. An embodiment of such a terminal, adapted to the magnetic reading of checks, is described in document FR-A-2898726. Such a solution has the disadvantage of resulting in a non-negligible extra cost and bulk, due to the presence of the additional measurement head and of the signal processing unit.

SUMMARY OF THE INVENTION

Thus, an object of an embodiment of the present invention is to provide a magnetic read device overcoming at least some of the disadvantages of prior art solutions.

Another object of an embodiment of the present invention is to provide such a device which requires no signal processing unit.

Another object of an embodiment of the present invention is to provide such a device of simple and low-bulk design.

Another object of an embodiment of the present invention is to provide a magnetic read head directly providing a signal independent from possible parasitic noise.

Another object of an embodiment of the present invention is to provide such a read head compatible with usual payment terminals.

Thus, an embodiment of the present invention provides a magnetic read device, comprising: a magnetic read head comprising a first conductive winding; and a second conductive winding connected in phase opposition to the first winding.

According to an embodiment of the present invention, the first and second windings are series-connected.

According to an embodiment of the present invention, the first and second windings are connected in parallel.

According to an embodiment of the present invention, the second winding is comprised in the read head.

According to an embodiment of the present invention, the first winding belongs to a first magnetic circuit providing, across the first winding, a signal representative of the magnetic flow variations at a first distance from a front surface of the head; and the second winding belongs to a second magnetic circuit providing, across the second winding, a signal representative of the magnetic flow variations at a second distance, greater than the first distance, from the front surface of the head.

According to an embodiment of the present invention, the first magnetic circuit comprises a first magnetic ring opened by a first gap, the first gap being located at the first distance from the front surface of the head.

According to an embodiment of the present invention, the second magnetic circuit comprises a second magnetic ring opened by a first gap, the second gap being located at the second distance from the front surface of the head.

According to an embodiment of the present invention, the first and second rings are arranged along first and second parallel or confounded planes.

According to an embodiment of the present invention, the second magnetic circuit has no magnetic core.

According to an embodiment of the present invention, the second distance is greater by from 0.3 to 3 mm than the first distance.

The foregoing and other objects, features, and advantages of the present invention will be discussed in detail in the following non-limiting description of specific embodiments in connection with the accompanying drawings.

DETAILED DESCRIPTION

Figure 1:
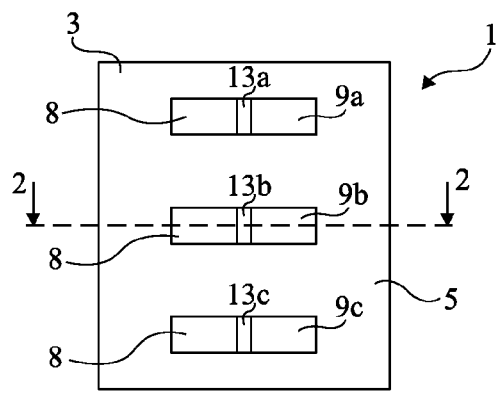
FIG. 1, previously described, schematically shows the front surface of a magnetic read head.

For clarity, the same elements have been designated with the same reference numerals in the different drawings and, further, the various drawings are not to scale. Further, only those elements which are useful to the understanding of the present invention have been shown and described.

In the present description, terms "front", "rear", "lower", "upper", "height", "width", "horizontal", "vertical", "center" arbitrarily refer to a read head in the orientation of FIG. 1.

The present invention will be described in relation with an example of a device capable of reading magnetic payment cards. It however more generally applies to any magnetic read head, for example, in the field of the magnetic reading of checks, transport tickets, audio media, computer disks, etc.

Figure 2:
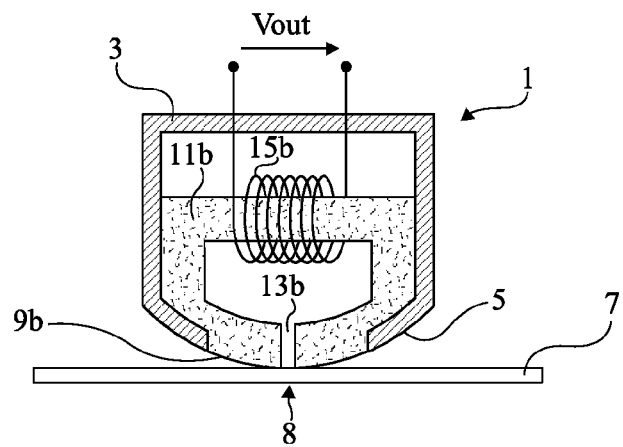
FIG. 2, previously described, is a cross-section view of the read head along plane 2-2 of FIG. 1.
Figure 3:
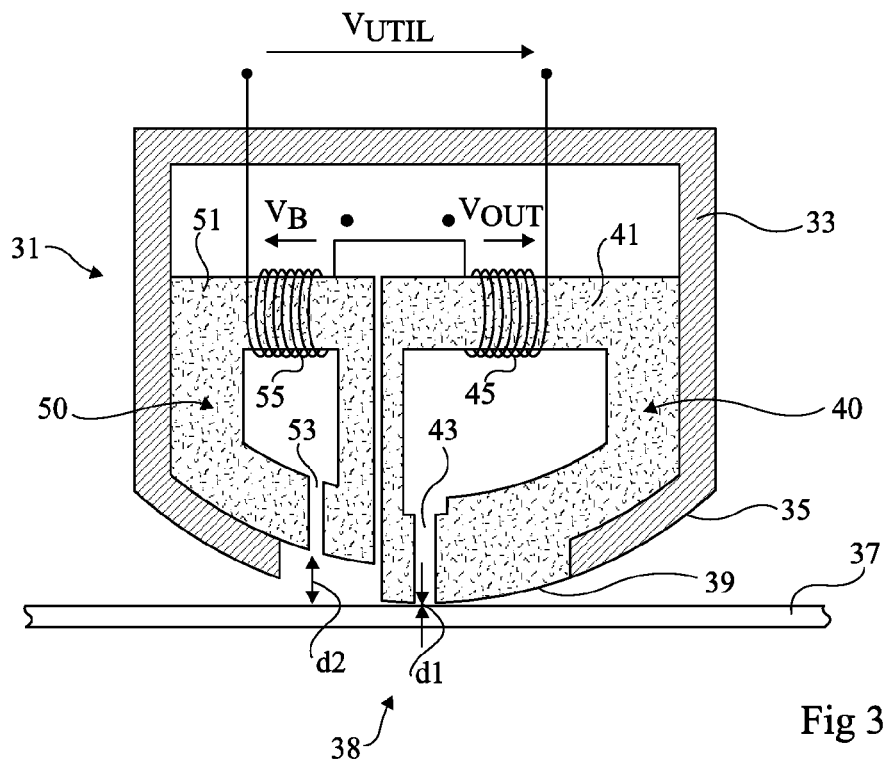
FIG. 3 is a cross-section view schematically showing an embodiment of a magnetic read head capable of providing a signal independent from the environment noise.

FIG. 3 is a cross-section view in the same plane as FIG. 2, schematically showing an embodiment of a magnetic read head 31 capable of directly providing a signal independent from electromagnetic disturbances of the environment.

Head 31 has a general shape substantially identical to that of read head 1 of FIGS. 1 and 2. It comprises a package 33, for example, made of metal, especially containing one or several electromagnetic read circuits. Package 33 comprises a front surface 35, of slightly bulged cross-section (in the plane of the drawing), comprising slots 38 parallel to one another defining reading paths (a signal reading path 39 can be seen in FIG. 3).

Package 33 contains at least one first magnetic circuit 40, comprising a ring-shaped magnetic core 41, defining path 39, and arranged along a plane substantially parallel to the upper and lower surfaces of the package. Ring 41 is opened by a non-magnetic gap 43, for example, made of air, vacuum, or a solid non-magnetic material such as brass or a resin or any other adapted material. Gap 43 is in contact with or at very short distance from the portion of path 39 at the contact of which a magnetic card 37 is intended to slide. In other words, gap 43 is located at a very short distance d1, for example, lower than 0.5 mm, from the front surface portion at the contact of which card 37 is intended to slide. In this example, gap 43 is arranged substantially at the center of slot 38 defining reading path 39. A conductive winding 45 is formed around ring 41, for example, around the region of ring 41 opposite to gap 43.

Unlike for read head 1 of FIG. 2, magnetic core 41 of magnetic circuit 40 does not take up the entire read head width. At the level of reading path 39, in the same plane as magnetic circuit 40, package 33 further contains a second magnetic circuit 50. Circuit 50 comprises a ring-shaped magnetic core 51, opened by a non-magnetic gap 53. Gap 53 is located on the side of slot 38, relatively close to gap 43. However, gap 53 is located at a distance d2, greater than distance d1, from the front surface of the read head. More generally, read head 31 is such that when a magnetic card slides in front of reading path 39, gap 53 is more distant from the read magnetic track than gap 43. As an example, the distance between gap 53 and card 37 may be greater by from 0.3 to 3 mm than the distance between gap 43 and card 37. A conductive winding 55 is formed around ring 51, for example around the region of ring 51 opposite to gap 53.

The sliding of a magnetic track of card 37 in front of gap 43 causes a magnetic flow variation in core 41 of magnetic circuit 40. This results in the occurrence of an induced current in conductive winding 45 and thus in a variation of voltage $V_{OUT}$ across winding 45. As in the case of the read head described in relation with FIG. 2, signal $V_{OUT}$ is tainted with noise. It actually is the sum of a wanted signal $V_{UTIL}$, representative of the magnetic flow variations induced by the sliding of the magnetic track in front of the gap, and of a noise signal $V_B$, representative of the magnetic flow variations induced by external disturbances.

The distance between gap 53 of second magnetic circuit 50 and the magnetic card is such that the sliding of the magnetic track in front of path 39 causes no substantial variation of the magnetic flow in core 51. Thus, the voltage across winding 55 only represents the magnetic flow variations induced by the environment disturbances. This voltage substantially corresponds to component $V_B$ of signal $V_{OUT}$. In practice, if the distance between the magnetic track and gap 53 is greater than 1 mm, the sliding of the magnetic track in front of the gap causes no substantial variation of the magnetic flow in core 51.

Windings 45 and 55 are connected in phase opposition. "Connection in phase opposition" means that the voltages induced across the windings by a same magnetic flow variation are in phase opposition. In practice, this means that the induced currents run through the windings according to opposite rotation directions (symbolized by the positions of the phase points). In the example of FIG. 3, windings 45 and 55 are series-connected and arranged along a same direction, but have opposite winding directions. As a result, the currents induced in windings 45 and 55 by the environment disturbances cancel. Thus, on sliding of a magnetic track in front of path 39, the dipole formed by the series connection of windings 45 and 55 directly provides across its terminals a signal $V_{UTIL}=V_{OUT}-V_B$, representative of the magnetic flow variations due to the sliding of the magnetic card in front of gap 43, independently from any external disturbance. Although, in this example, magnetic cores 41 and 51 are in contact with each other, the present invention is not limited to this specific case.

An advantage of such a magnetic read head is that it enables to provide a signal substantially independent from the environment disturbances, and this, whatever the intensity and the frequency band of the disturbances. Such a read head has the advantages of a having a simple design, of requiring no additional filtering and/or signal processing unit, and of being directly compatible with existing payment terminals. Further, the general shape of the read head and the dimensions of the read head are substantially identical to those of usual read heads.

Figure 4:
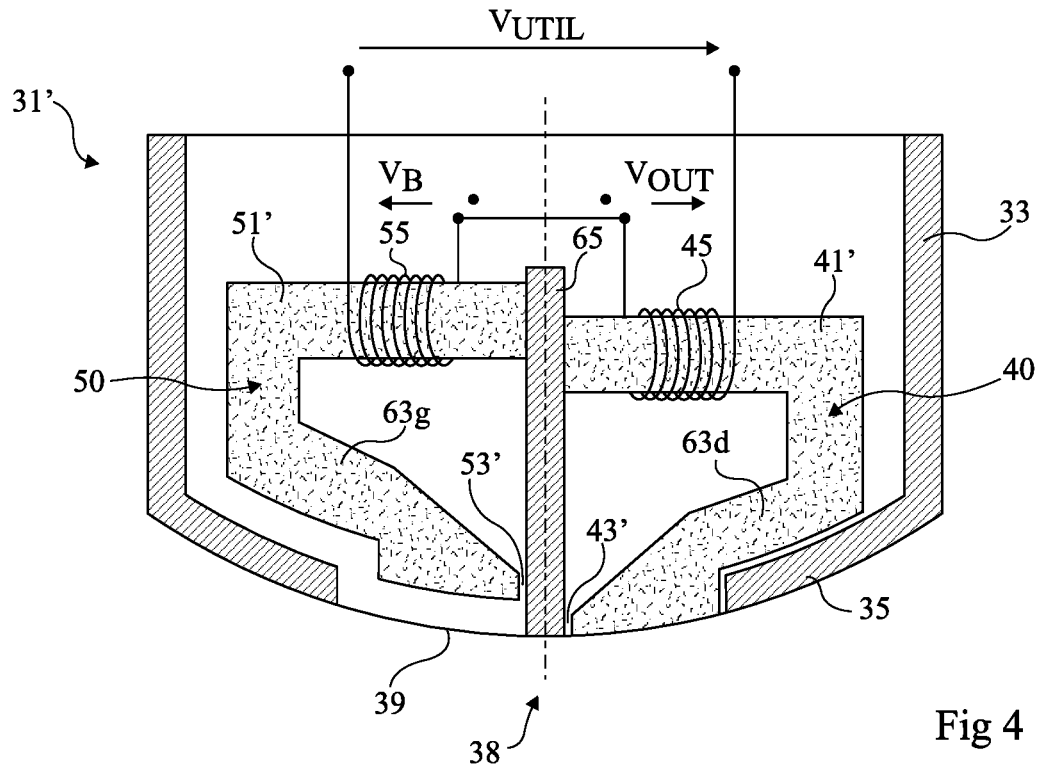
FIG. 4 is a cross-section view schematically showing an alternative embodiment of the read head of FIG. 3.

FIG. 4 is a cross-section view in the same plane as FIG. 3 schematically showing an alternative embodiment 31' of read head 31 described in relation with FIG. 3. A difference between head 31' and head 31 is the geometric ring arrangement of the magnetic cores. In head 31', the magnetic cores are formed from two substantially U-shaped identical magnetic pieces 63g and 63d. U-shaped pieces 63g and 63d are placed on either side of a central rectilinear magnetic rod 65, so that piece 65 closes the two Us formed by pieces 63g and 63d. On the side of slot 38, the end of each U is separated from piece 65 by a gap. In magnetic noise measurement circuit 50 (to the left of the drawing), U-shaped piece 63g is slightly more distant from the front surface of the head than in magnetic circuit 40 for reading the signal. Thus, gap 53' of circuit 50 is more distant from the magnetic card sliding region than gap 43' of circuit 40.

An advantage of such a read head is that its series manufacturing is eased by the fact that the cores of the magnetic circuits for reading the wanted signal and measuring the noise are made from identical pieces 63g, 63d.

According to a preferred embodiment, magnetic circuits 40 and 50 have similar characteristics. In particular, the impedances, the gap dimensions, and the number of spirals of the windings are approximately identical. Further, windings 45 and 55 are preferably arranged along parallel or confounded directions. Moreover, gap 53 is preferably arranged close to gap 43, to measure a noise signal $V_B$ as close as possible to the noise affecting the wanted signal.

Figure 5:
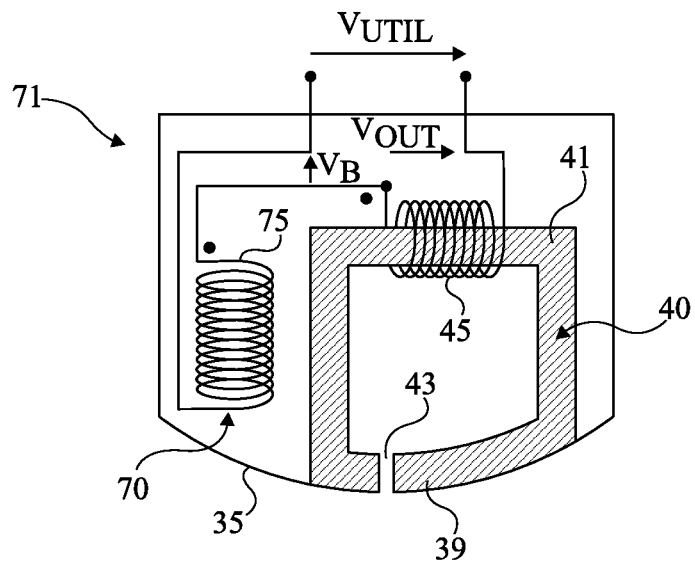
FIG. 5 is a cross-section view in the same plane as FIG. 3, very schematically showing another embodiment of a magnetic read head.

FIG. 5 is a cross-section view in the same plane as FIG. 3, very schematically showing another embodiment of a read head 71. Head 71 comprises a magnetic noise measurement circuit 70 having a winding 75 approximately comprising the same number of spirals as winding 45 of circuit 40. Circuit 70 has no magnetic core. In this example, winding 75 is arranged along a direction orthogonal to the direction of winding 45. Winding 75 could be arranged along any other direction and/or along any other plane. Windings 75 and 45 are connected in phase opposition, for example, in series.

In head 71, noise signal $V_B$ provided by the noise measurement circuit is less representative of the noise affecting wanted signal $V_{OUT}$ than in the case of head 31 of FIG. 3. However, head 71 provides, across the dipole formed by the series connection of windings 75 and 45, a signal $V_{UTIL}$ much less sensitive to parasitic disturbances than the output signals of usual read heads. Such an embodiment has the advantage of being particularly simple to implement.

Other embodiments and other arrangements of the magnetic noise measurement circuit may be provided. In particular, the number of spirals of winding 75 may be different from the number of spirals of winding 45. Generally, the magnetic noise measurement circuit is sufficiently more distant from the front surface of the read head than signal measurement circuit 40, so as not to be sensitive to magnetic flow variation associated with the sliding of a magnetic card in front of the front surface of the read head.

According to an alternative embodiment, the magnetic noise measurement circuit is located outside of the read head, for example, on a printed circuit board of the payment terminal Such an embodiment has the advantage of being particularly simple to implement. The read head then is a usual read head, of the type described in relation with FIGS. 1 and 2, the head cord being used to connect the winding of the magnetic signal measurement circuit to the winding of the external magnetic noise measurement circuit.

Figure 6:
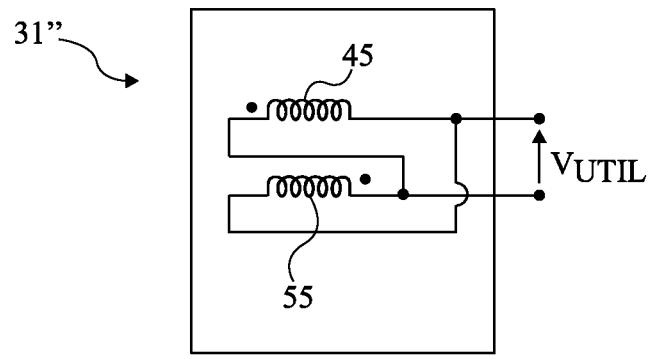
FIGS. 6 to 8 are electric diagrams illustrating various alternative embodiments of magnetic read heads capable of providing signals independent from the environment noise.

FIG. 6 is an equivalent electric diagram of another embodiment of a read head 31" structurally identical to head 31 of FIG. 3. In head 31", windings 45 and 55 are connected in parallel, in phase opposition. Output signal $V_{UTIL}$ of head 31", representative of the magnetic flow variations associated with the sliding of the magnetic track independently from external disturbances, is read across the dipole formed by the parallel connection of the windings.

Figure 7:
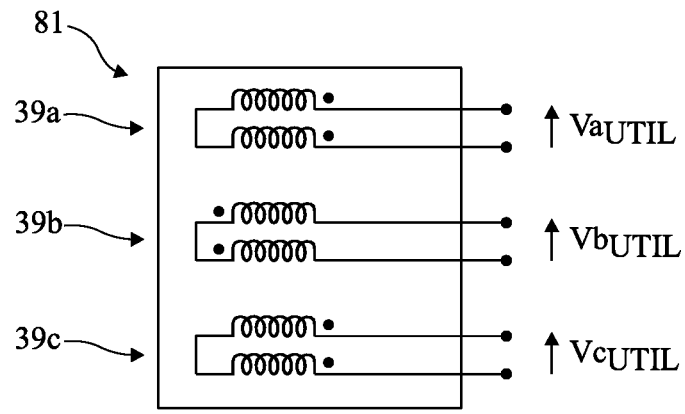

FIG. 7 is an equivalent electric diagram of an alternative embodiment of a read head 81. Head 81 comprises three reading paths 39a, 39b, 39c. A magnetic circuit for reading the noisy signal and a magnetic noise measurement circuit is associated with each path. For each path, the windings of the wanted signal read circuit and of the noise measurement circuit are connected in series and in phase opposition. Head 81 provides signals $Va_{UTIL}$, $Vb_{UTIL}$, $Vc_{UTIL}$, respectively representative of the magnetic flow variations associated with the sliding of magnetic tracks in front of paths 39a, 39b, 39c. Each signal $Va_{UTIL}$, $Vb_{UTIL}$, $Vc_{UTIL}$ is read across the dipole formed by the series connection of the windings associated with the corresponding path.

Figure 8:
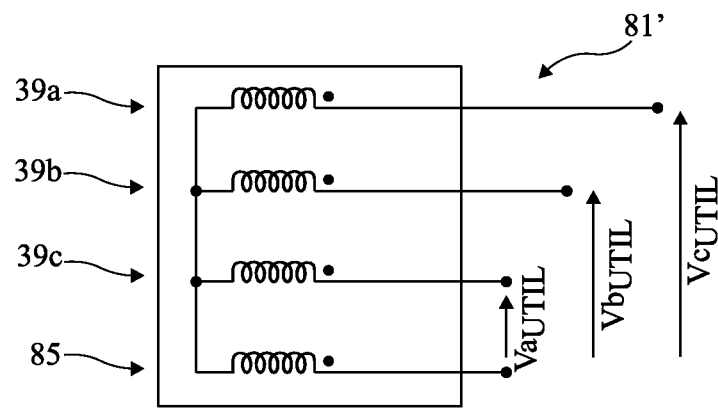

FIG. 8 is an equivalent electric diagram of another alternative embodiment 81' of the read head of FIG. 7. Head 81' comprises three reading paths 39a, 39b, 39c. A magnetic circuit for reading the noisy signal of the type described in relation with FIG. 2 is associated with each path. Head 81' further comprises a magnetic noise measurement circuit 85, for example, a magnetic circuit of the type described in relation with FIG. 2, but with its gap slightly recessed from the front surface of the read head, so that the sliding of a magnetic track in front of the front surface of the read head causes no magnetic flow variation in circuit 85. The winding of noise measurement circuit 85 is connected in series and in phase opposition to each of the windings of the signal read circuits associated with reading areas 39a, 39b, 39c. Head 81' provides output signals $Va_{UTIL}$, $Vb_{UTIL}$, $Vc_{UTIL}$, respectively representative of the magnetic flow variations associated with the sliding of magnetic tracks in front of paths 39a, 39b, 39c. Each signal $Va_{UTIL}$, $Vb_{UTIL}$, $Vc_{UTIL}$ is read across the dipole formed by the series connection of the corresponding windings.

Common magnetic noise measurement circuit 85 may be placed either at the level of a fourth virtual reading path, in a plane distinct from reading areas 39a to 39c, or at the level of one of reading areas 39a to 39c, according to an arrangement of the type described in relation with FIGS. 3 and 4, or outside of the read head. According to an alternative embodiment, if circuit 85 is placed in a plane distinct from reading areas 39a to 39c, its gap will not necessarily be recessed from the front surface. Indeed, in this case, the height offset may be sufficient to make circuit 85 insensitive to magnetic flow variations associated with the sliding of the magnetic card in front of the front surface.

Specific embodiments of the present invention have been described. Various alterations, modifications and improvements will readily occur to those skilled in the art.

In particular, it should be noted that for each of the embodiments described in relation with FIGS. 6 to 8, variations in which the electric connections of the windings in phase opposition are performed outside of the read head may be provided.

Further, it will be within the abilities of those skilled in the art to implement the desired operation whatever the number of reading areas.

Further, although the above description only relates to read heads, it will be within the abilities of those skilled in the art to implement the desired operation in magnetic write heads.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A magnetic read device, comprising:
    a magnetic read head (71; 81) comprising a first magnetic circuit (40) providing, at the terminals of a first conductive winding (45), a signal (VOUT) representative of magnetic flux variations at a first distance (d1) of a front face of the head; and
    a second magnetic circuit (70) providing, at the terminals of a second conductive winding (75) connected in phase opposition to the first winding, a signal (VB) representative of magnetic flux variations at a second distance (d2), greater than the first distance, from the front face of the head,
    wherein the first conductive winding (45) is formed around a magnetic core (41) and the second conductive winding is not formed around a magnetic core.

2. The device of claim 1, wherein the first and second windings are series-connected.

3. The device (31") of claim 1, wherein the first and second windings are connected in parallel.

4. The device (31; 71; 81) of claim 1, wherein the second winding is comprised in the read head.

5. The device of claim 1, wherein:
    the first winding belongs to a first magnetic circuit (40) providing, across the first winding, a signal (VOUT) representative of the magnetic flow variations at a first distance (dl) from a front surface of the head; and
    the second winding belongs to a second magnetic circuit (50; 70) providing, across the second winding, a signal (VB) representative of the magnetic flow variations at a second distance (d2), greater than the first distance, from the front surface of the head.

6. The device of claim 1, wherein the second distance is greater by from 0.3 to 3 mm than the first distance.

7. The device (31; 71) of claim 5, wherein the first magnetic circuit (40) comprises a first magnetic ring (41) opened by a first gap (43), the first gap being located at the first distance (dl) from the front surface of the head.

* * * * *